United States Patent

Wei et al.

[11] Patent Number: 6,031,045
[45] Date of Patent: Feb. 29, 2000

[54] WATER-BASED SULFONATED POLYMER COMPOSITIONS

[75] Inventors: Yi Wei, St. Paul; Youlu Duan, Maplewood; Yuduo Zhu, Woodbury, all of Minn.

[73] Assignee: H. B. Fuller Licensing & Financing, Inc., St. Paul, Minn.

[21] Appl. No.: 08/909,578

[22] Filed: Aug. 12, 1997

Related U.S. Application Data

[63] Continuation-in-part of application No. 08/689,752, Aug. 13, 1996, Pat. No. 5,807,919.

[51] Int. Cl.⁷ ............................. C08J 3/00; C08J 3/02; C08K 3/20; C08L 75/00
[52] U.S. Cl. .................. 524/840; 524/457; 524/507; 524/501; 524/591; 524/839
[58] Field of Search ............................ 524/507, 591, 524/839, 840, 501, 457

[56] References Cited

U.S. PATENT DOCUMENTS

| | | | |
|---|---|---|---|
| 4,185,138 | 1/1980 | Graham | 428/391 |
| 4,301,052 | 11/1981 | Pollman | 260/29.2 |
| 4,318,833 | 3/1982 | Guagliardo | 524/457 |
| 4,394,418 | 7/1983 | Temple | 428/391 |
| 4,491,646 | 1/1985 | Gruber et al. | 524/558 |
| 4,626,567 | 12/1986 | Chang | 524/493 |
| 4,745,028 | 5/1988 | Das et al. | 428/391 |
| 4,888,383 | 12/1989 | Huybrechts | 524/832 |
| 4,956,240 | 9/1990 | Williams et al. | 428/423 |
| 5,071,904 | 12/1991 | Martin et al. | 524/458 |
| 5,173,526 | 12/1992 | Vijayendran et al. | 524/457 |
| 5,200,463 | 4/1993 | Flakes | 524/591 |
| 5,204,404 | 4/1993 | Werner, Jr. et al. | 524/501 |
| 5,236,982 | 8/1993 | Cossement et al. | 524/188 |
| 5,331,039 | 7/1994 | Blum et al. | 524/507 |
| 5,334,690 | 8/1994 | Schafheutle et al. | 528/71 |
| 5,371,133 | 12/1994 | Stanley | 524/457 |
| 5,494,980 | 2/1996 | Buter et al. | 525/455 |
| 5,496,907 | 3/1996 | Dochniak | 528/73 |
| 5,541,251 | 7/1996 | Bontinck et al. | 524/507 |
| 5,608,000 | 3/1997 | Duan et al. | 524/591 |
| 5,610,232 | 3/1997 | Duan et al. | 524/840 |

FOREIGN PATENT DOCUMENTS

| | | |
|---|---|---|
| 0 465 | of 0000 | European Pat. Off. . |
| 0599245 | 6/1994 | European Pat. Off. . |
| 0 794 203 A2 | 9/1997 | European Pat. Off. . |

OTHER PUBLICATIONS

"Handbook of Adhesives" by Irving Skeist, 3rd Ed. Ch.1. p. 18, Yen Nostrand, NY, 1990.
Kohler, *J. Am. Chem.* Soc., 49, 3181 (1927).
"polyvinyl Alcohol Developments", ed. C. A. Finch, John Wiley & Sons, NY 1992, 449–453.
Patent Abstracts of Japan, vol. 006 No. 40 (C–094), Mar. 12, 1982 & JP 56157476 A, Dec. 4, 1981.

*Primary Examiner*—Patrick D. Niland
*Attorney, Agent, or Firm*—Vidas, Arrett & Steinkraus

[57] ABSTRACT

A method for the preparation of sulfonated polymer compositions wherein water dispersible isocyanate-terminated polyurethane prepolymers are reacted in the presence of aqueous polyvinyl dispersions which may contain active hydrogen atoms. The invention is further directed to a water-based sulfonated polyurethane polyvinyl hybrid latex wherein a sulfonated polyurethane is used as a seed for the polymerization of ethylenically unsaturated monomers and a method for preparing the same. The inventive compositions develop interpenetrating polymer networks or may form core-shell type structures, and are characterized as having enhanced mechanical and adhesion properties.

21 Claims, 2 Drawing Sheets

WATER-BASED SULFONATED POLYMER COMPOSITIONS

CROSS REFERENCE TO RELATED APPLICATIONS

This case is a continuation-in-part of U.S. application Ser. No. 08/689,752, filed Aug. 13, 1996, now issued as U.S. Pat. No. 5,807,919.

This invention relates to water-based polymers, specifically to a method for the preparation of water-based sulfonated polymer compositions having enhanced mechanical and adhesion properties.

BACKGROUND OF THE INVENTION

There are several patents which disclose the preparation of water-based sulfonated polymer compositions:

U.S. Pat. No. 5,334,690 (Hoechst Aktiengesellschaft) discloses water-based sulfonated polyurethane-urea polymers which can be combined with and are in general compatible with other aqueous polymer dispersions.

U.S. Pat. No. 4,888,383 (E. I. DuPont De Nemours and Company) discloses a process wherein water-based polyurethane-urea modified acrylic polymers are prepared by reacting amine and/or hydrazide functional polyacrylic polymers with isocyanate terminated polyurethane prepolymers.

U.S. Pat. No. 4,491,646 (Ashland) discloses adhesives wherein hydroxyl functional polyvinyl polymers are blended with water dispersible polyfunctional isocyanates.

Other related patents include U.S. Pat. No. 5,371,133 (National Starch), U.S. Pat. No. 5,200,463 (Huels), U.S. Pat. No. 5,204,404 (DuPont), U.S. Pat. No. 5,173,526 (Air Products & Chemicals, Inc.) and U.S. Pat. No. 5,071,904 (PPG).

SUMMARY OF THE INVENTION

The present invention discloses water-based sulfonated polymer compositions comprising:

A) at least one water-based sulfonated polyurethane-urea polymer comprising:
  1) at least one polyisocyanate; and
  2) at least one sulfonated polyester polyol wherein the sulfonate groups are present in the form of alkali metal salts;
B) at least one aqueous polyvinyl dispersion comprising;
  1) at least one ethylenically unsaturated monomer;
  2) and optionally, at least one free radically reactive protective colloid comprising active hydrogen atoms; and optionally,
C) at least one sulfonated polyurethane-vinyl polymer composition which is the reaction product of;
  1) at least one isocyanate-terminated polyurethane prepolymer comprising;
    a) at least one polyisocyanate; and
    b) at least one sulfonated polyester polyol wherein the sulfonate groups are present in the form of alkali metal salts; with
  2) an aqueous polyvinyl dispersion comprising;
    a) at least one ethylenically unsaturated monomer; and optionally,
    b) at least one free radically reactive protective colloid comprising active hydrogen atoms.

Surprisingly, the sulfonated polymer compositions have enhanced mechanical and adhesion properties and show stability at pH values greater than about 2.0. It is surmised that some of these unique properties can be attributed to the development of interpenetrating polymer networks and the sulfonate character located in the polyol segment of the polyurethane polymer.

The inventive compositions are useful as adhesives, binders, coatings and primers on any substrate including paper, wood, metals, concrete, glass, cloth and synthetic polymers, and are useful in applications including fiber grass sizing, woodworking, automotive, film laminating and in the manufacture of shoes.

In another aspect, the present invention discloses a method for the preparation of sulfonated polymer compositions wherein isocyanate terminated polyurethane prepolymers are dispersed in aqueous polyvinyl dispersions which may contain primary amines, secondary amines, primary hydroxyl groups, secondary hydroxyl groups and formamide groups. The method comprising:

A) forming a water dispersible isocyanate-terminated polyurethane prepolymer by reacting;
  1) at least one polyisocyanate; and
  2) at least one sulfonated polyester polyol wherein the sulfo groups are present in the form of alkali metal salts;
B) forming an aqueous polyvinyl dispersion by free radically polymerizing;
  1) at least one ethylenically unsaturated monomer; and optionally,
  2) at least one free radically reactive protective colloid comprising active hydrogen atoms; and then
C) dispersing the product of A) into B).

In another aspect, the present invention discloses a water based sulfonated polymer composition and a method of making the same by seed emulsion polymerization. The composition comprises the reaction product of:

a) at least one sulfonated polyurethane dispersion;
b) at least one aqueous ethylenically unsaturated monomer pre-emulsion comprising at least one ethylenically unsaturated monomer; and
c) an initiator.

The method of preparing the same comprises the steps of:

a) forming an aqueous pre-emulsion comprising at least one ethylenically unsaturated monomer pre-emulsion comprising at least one ethylenically unsaturated monomer and optionally at least one surfactant; and
b) reacting said aqueous pre-emulsion with at least one sulfonated polyurethane dispersion optionally in the presence of an initiator solution and optionally in the presence of a reducer solution.

In another aspect, the present invention discloses a polyurethane/polyvinyl hybrid latex and a method of making the same by seed emulsion polymerization. The hybrid latex comprises the seed emulsion polymerization reaction of:

a) at least one sulfonated polyurethane dispersion, the polyurethane serving as a seed;
b) at least one aqueous ethylenically unsaturated monomer pre-emulsion comprising at least one ethylenically unsaturated monomer; and
c) at least one free radical initiator.

DETAILED DESCRIPTION OF THE INVENTION

Figure 1:
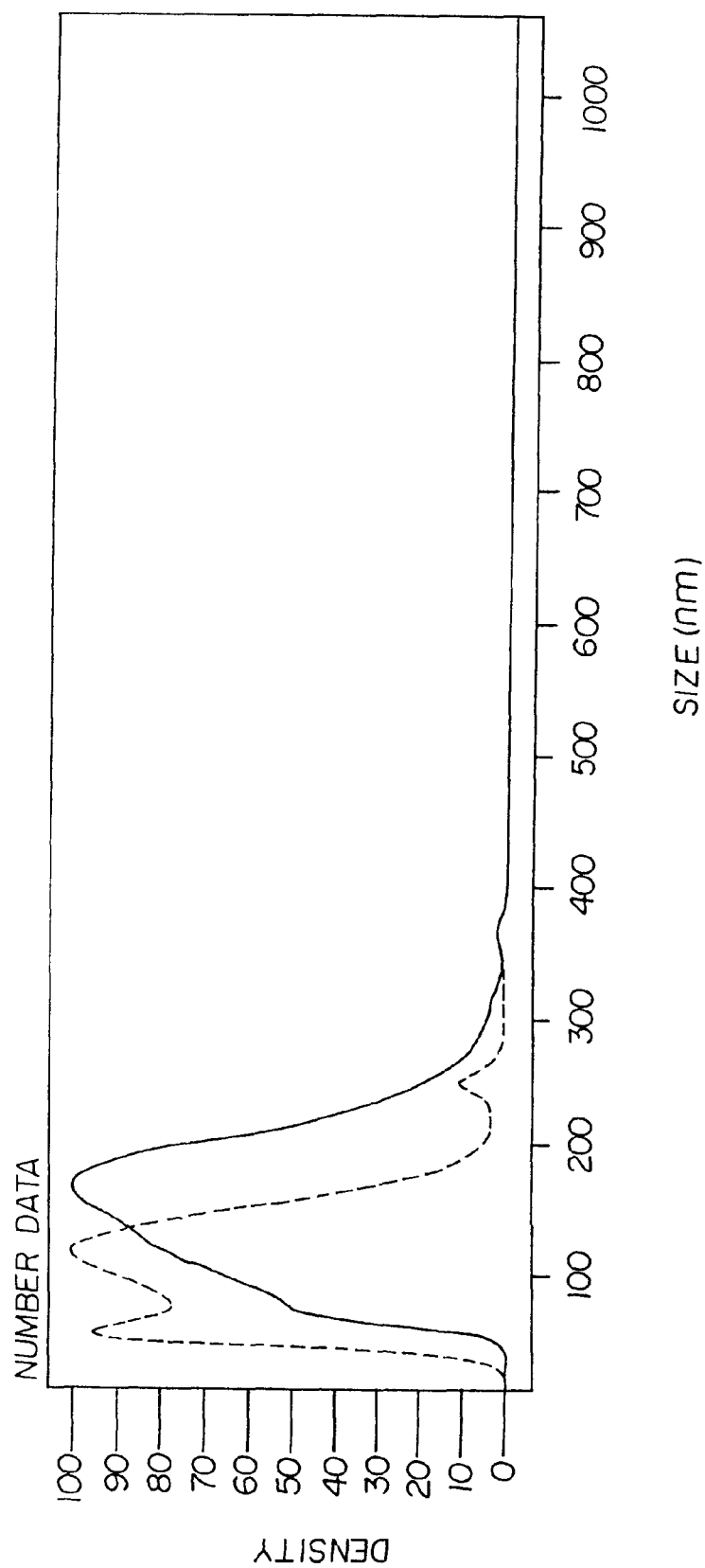
FIG. 1 is a graph showing the seed polyurethane particle size distribution (dotted line) as a function of the final hybrid latex particle distribution (solid line), for the latex (water based sulfonated polymer composition) prepared in Example 6.

The sulfonated polymer compositions have enhanced mechanical and adhesion properties compared to their corresponding water-based sulfonated polyurethane-urea polymers, aqueous polyvinyl dispersions and their simple blends. For the purposes of the present application, polyvinyl dispersions include dispersions of addition polymerization products of ethylencially unsaturated monomers including, but not limited to (meth)acrylate monomers. Also, polyurethane refers in the present application to a polymer containing more than one urethane group and is intended to include polyurethanes containing urea groups as well (polyurethane-ureas). It is surmised that some of these unique properties can be attributed to the formation of interpenetrating polymer networks. The term "interpenetrating polymer network" is defined as a crosslinked and/or semi crosslinked system comprising at least two dissimilar or different polymers. IPNs are further described in the "Handbook of Adhesives", Irving Skeist, 3rd edition, chapter 1, page 18, Van Nostrand, N.Y., 1990.

For the the purposes of the present application, "hybrid" denotes a polymer comprised of two or more dissimilar polymers. The dissimilar polymers may or may not be covalent linked.

In the present invention, when isocyanate-terminated polyurethane prepolymers are dispersed in aqueous polyvinyl dispersions, which may contain active hydrogen atoms such as primary amines, secondary amines, primary hydroxyl groups and secondary hydroxyl groups, the isocyanate terminated polyurethane prepolymer dispersions interact with the aqueous polyvinyl dispersions to form IPNs and crosslinked networks. The frequency of such interactions can be influenced by the quantity of isocyanate and active hydrogen atoms present in the respective polymer dispersions. It is possible to increase the crosslink density using a structured aqueous polyvinyl dispersion wherein active hydrogen atoms are distributed on the surface of the particle. A structured particle can be generated when ethylenically unsaturated monomers, containing active hydrogen atoms, are added at the end of the free radical emulsion polymerization process. It is believed that such a particle morphology improves the collision frequency of the isocyanate/ active hydrogen atom reaction to increase the composition's crosslink density.

The dispersed particles can contain a complex mixture of polymers consisting of sulfonated polyurethane-urea polymers, polyvinyl polymers and sulfonated polyurethane-vinyl polymers. The complex particle mixtures can be formed when substantially dissimilar or substantially different polymers diffuse and interact or crosslink with adjacent particles. Such diffusion processes may generate particles having polymers within the particle that are different when compare with polymers on the surface of the particle. Examples include particles having substantially polyvinyl based polymers on the surface of predominantly polyurethane-urea based particles or substantially polyurethane-urea based polymers on the surface of predominantly polyvinyl based particles. Such surface layers may be continuous or non-continuous and can vary in thickness. If a particle's surface layer has a substantial thickness, as well as being continuous, then the particle approaches a core-shell type structure.

The isocyanate-terminated polyurethane prepolymers of the present invention may be formed using monoisocyanates and polyisocyanates. The isocyanates may be linear aliphatic, cyclic aliphatic, aromatic and mixtures thereof Examples of commercially available polyisocyanates include Vestanat® IPDI which is isophorone diisocyanate from HULS America Inc. (Piscataway, N.J.), TMXDT® which is tetramethylxylene diisocyanate from Cyaramid (Wayne, N.J.), Luxate® HM which is hexamethylene diisocyanate from Olin Corporation (Stamford, Conn.), diphenylmethane diisocyanate from Upjohn Polymer Chemicals (Kalamazoo, Mich.), Desmodur® which is dicyclohexylmethane-4,4'-diisocyanate from Bayer Corporation (Pittsburgh, Pa.) and toluene diisocyanate (TDI). The preferred diisocyanates are hexamethylene diisocyanate, isophorone diisocyanate and their mixtures.

If desired, small quantities of polyisocyanates which have an isocyanate content greater than 2.1 may be used. Additionally, modified polyisocyanates which are prepared from hexamethylene diisocyanate, isophorone diisocyanate and toluene diisocyanate may also be used. Said polyisocyanates can have functionalities including urethanes, uretdiones, isocyanurates, biurets and mixtures thereof.

The sulfonated polyester polyol component used in the preparation of the isocyanate-terminated polyurethane prepolymer can have hydroxyl numbers, as determined by ASTM designation E-222-67 (Method B), in a range from about 20 to about 140, and preferably from about 40 to about 110. The polyols may be formed with components such as diacids, diols, sulfonate diols and sulfonate diacids. Such polyols and their preparation are further described in U.S. Pat. No. 5,334,690, incorporated herein by reference. The preferred sulfonated polyester polyols are based on 5-sulfoisophthalic acid monosodium salt, adipic acid and 1,6-hexanediol and/or diethylene glycol. It is believed that the sulfonate character, which is present in the polyol segment, enhances the polymer's dispersibility and stability at reduced pH.

Optionally, non-sulfonated polymeric diols may be used in combination with the sulfonated polyester polyols. Such polyols may have hydroxyl numbers in a range from about 20 to about 140, and preferably from about 40 to about 110. The non-sulfonated polymeric polyols may include polyester polyols, polyether polyols, polycarbonate polyols, polyurethane polyols, polyacetal polyols, polyacrylate polyols, polycaprolactone polyols, polyesteramide polyols, polythioether polyols, and mixtures thereof.

Alkylene diols may also be used in the preparation of the isocyanate-terminated prepolymers. The alkylene diols may have hydroxyl numbers in a range from about 130 to about 1250, and preferably from about 950 to about 1250. The preferred alkylene diols include 1,4-butanediol, 1,6-hexanediol and 2-methyl-1,3-propanediol and may be present in the isocyanate terminated polyurethane prepolymer in a range from about 0.1% by weight to about 10.0% by weight, and preferably from about 0.5% by weight to about 5.0% by weight, based on 100 parts of total prepolymer solids.

Higher functional polyols may be used in the preparation of the polyurethane-urea polymers. Suitable examples include glycerol, trimethylolpropane, 1,2,4-butane triol, 1,2, 6-hexane triol and mixtures thereof. The preferred higher functional polyol is trimethylolpropane. Said polyols may be present in a range from about 0.1% by weight to about 1.0% by weight, and preferably from about 0.3% by weight to about 0.7% by weight, based on 100 parts of total isocyanate-terminated polyurethane prepolymer solids.

Optionally, dihydroxy carboxylic acids may be used when preparing the isocyanate-terminated polyurethane prepolymer. A preferred dihydroxy carboxylic acid is dimethylolpropionic acid. The dihydroxy carboxylic acid component may be present in a range from about 0.05% by weight to about 1.0% by weight, and preferably from about 0.2% by weight to about 0.5% by weight, based on 100 parts total polyurethane prepolymer solids.

Neutralization of the dihydroxy carboxylic acid groups can be accomplished with compounds such as alkali metal hydroxides, organic tertiary amines, ammonia and mixtures thereof. Preferred neutralizing agents are sodium hydroxide and triethylamine. Conversion of the acid groups to ionic groups (salts) can be accomplished before, or at the same time, that, the isocyanate terminated polyurethane prepolymer has been dispersed in the polyvinyl dispersion mixture.

The isocyanate-terminated polyurethane prepolymer is prepared by reacting a stoichiometric excess of polyisocyanate with said polyol components. The reactants are in such proportions that the resulting percent isocyanate may be in a range from about 1.0% by weight to about 10.0% by weight, and preferably from about 2.0% by weight to about 5.0% by weight, based on 100 parts total of isocyanate terminated polyurethane prepolymer solids. The prepolymers may be processed at temperatures in a range from about 30° C. to about 110° C., and preferably from about 65° C. to about 85° C.

Additionally, small quantities of catalysts may be used to accelerate the hydroxy/isocyanate reaction. The catalysts can be present in a range from about 0.05% by weight to about 2.0% by weight, and preferably from about 0.13% by weight to about 0.15% by weight, based on 100 parts total isocyanate-terminated polyurethane prepolymer solids. An example includes Metacure™ T-12 which is an organic tin compound from Air Products and Chemicals, Inc. (Allentown, Pa.).

The ethylenically unsaturated monomers can include monounsaturated monomers, polyunsaturated monomers and mixtures thereof. Examples include methyl acrylate, ethyl acrylate, n-butyl acrylate, isobutyl acrylate, n-propylacrylate, iso-propyl acrylate, methyl methacrylate, butyl methacrylate, vinyl acetate, vinyl propionate, vinyl ethers, ethylenically unsaturated fumerates, ethylenically unsaturated maleates, styrene, acrylonitrile, acrylamides, butanediol diacrylate, hexanediol diacrylate, ethylene glycol dimethacrylate, trimethylolpropane triacrylate and pentaerythritol triacrylate.

Ethylenically unsaturated monomers containing anionic and/or ionic groups can be used. Examples of such monomers include acrylic acid, methacrylic acid, fumaric acid, crotonic acid, itaconic acid, mesaconic acid, maleic acid, citraconic acid and/or their corresponding ionic groups. Said monomers may be in a range from about 0.1% by weight to about 25.0% by weight, and preferably from about 0.1% by weight to about 10.0% by weight, based on 100 parts total composition solids.

Ethylenically unsaturated monomers containing active hydrogen atoms may also be used. The term "active hydrogen atoms" refers to hydrogens which display activity according to the Zerewitinoff test as described by Kohlerin, J. Am. Chem. Soc., 49,3181 (1927). Examples include hydroxyethyl acrylate, allyl alcohol, allyl amine, N-methylol acrylamide, mono-acrylic acid esters of glycols, itaconic acid and methyl-3-aminocrotonate.

Amine and hydroxyl functional protective colloids may be used to prepare the aqueous polyvinyl dispersion of the present invention. Suitable examples include the water dispersible polyvinyl alcohol-copoly(vinyl amine) polymers described in EP 0599245 assigned to Air Products and Chemicals, Inc. (Allentown, Pa.). Such protective colloids may have an amine content in a range from about 0.5 meq. amine/gram to about 3.5 meq. amine/gram, and preferably from about 1.0 meq. amine/gram to about 3.0 meq. amine/gram. The number average molecular weight may be in a range from about 10,000 grams/mol. to about 350,000 grams/mol., and preferably from about 30,000 grams/mol. to about 250,000 grams/mol. Said colloids can be present in a range from about 0.1% by weight to about 20.0% by weight, and preferably from about 0.5% by weight to about 5.0% by weight, based on 100 parts total polyacrylic solids. It is assumed grafting reactions occur during the emulsion polymerization process. The graft copolymerization process is further described in "Polyvinyl Alcohol Developments", edited by C. A. Finch, John Wiley & Sons, New York, 1992, pp. 449–453.

Specialty monomers may also be incorporated into the aqueous polyvinyl dispersions and include the amino organo-silane coupling agents described in U.S. Pat. No. 4,745,028 (PPG) and U.S. Pat. No. 5,236,982, (Owens-Corning), the imidazolidinone functional wet adhesion monomers described in U.S. Pat. No. 5,496,907, (H. B. Fuller Co., St. Paul, Minn.) and the Vinamer® EF monomer which is N-ethenylformamide from Air Products Chemicals, Inc. (Allentown, Pa.).

When Vinamer EF monomers are incorporated into the aqueous polyvinyl dispersions, the bound formamide group may be hydrolyzed to a primary amine using catalysts such as bases or acids including sodium hydroxide, hydrochloric acid and sulfuric acid. The resulting amine functional polyvinyl can then be used as a reactive component in the process of the present invention.

The aqueous polyvinyls can be formed using materials and free radical polymerization processes known in the art. For example, the free radical initiators, used in the addition polymerization process, may be water soluble, oil soluble or mixtures thereof. Examples include hydrogen peroxide, sodium persulfate, potassium persulfate, ammonium persulfate, 2,2-azobis (2,4-dimethylpentanenitrile), 2,2-azobis (2-methylpropanenitrile) and mixtures such as t-butylhydroperoxide, Fe.EDTA and isoascorbic acid. Said initiators may be present in amounts from about 0.05% by weight to about 1.5% by weight, and preferably from about 0.1% by weight to about 0.5% by weight, based on 100 parts total solids. Also, oxidizing catalysts may be used independently or in combination with reducing agents such as sodium formaldehyde-sulfoxylate, ferrous salts, sodium dithionite, sodium hydrogen sulfite, sodium sulfite and sodium thiosulfate. The redox catalysts may be present in amounts from about 0.05% by weight to about 1.5% by weight, preferably from about 0.1% by weight to about 0.5% by weight, based on 100 parts total solids.

The ethylenically unsaturated monomers are polymerized using free radical polymerization techniques known in the art. The free radical initiators can be added all at once, slowly over time or as a partial initial charge with the remainder being added slowly over time.

Free radical polymerization may be conducted at temperatures in a range from about 5° C. to about 85° C., and preferably from about 25° C. to about 80° C.

The water-based sulfonated polymer compositions of the present invention are formed using a method wherein isocyanate-terminated polyurethane prepolymers are dispersed in an aqueous polyvinyl dispersion which may contain primary amines, secondary amines, primary hydroxyl groups, secondary hydroxyl groups and formamide groups. It is also possible to disperse the isocyanate-terminated polyurethane prepolyrner in water and then immediately blend with the aqueous polyvinyl dispersion. Optionally, the aqueous polyvinyl dispersion may be added to a neat or water dispersed isocyanate-terminated polyurethane prepolymer. The dissimilar polymers are suitably combined at temperature in a range from about 25° C. to about 95° C., preferably from about 45° C. to about 75° C.

If amine functional aqueous polyvinyl dispersions are used, the polymer components may be blended using an equivalence ratio of amine active hydrogen to isocyanate in a range from about 1:10 to about 10:5, and preferably from about 1:5 to about 5:1.

If desired, water soluble compounds containing primary and/or secondary amines may be reacted with the polymer mixture of the invention. Suitable examples include monoethanolamine, ethylenediamine, diethylene triamine and ammonia.

The water-based sulfonated polymer compositions may have viscosities in a range from about 10 mPa.s to about 1,000 mPa.s, and preferably from about 10 mPa.s to about 500 mPa.s. The particle size distribution may be monomodal or multimodal and generally will have a mean diameter in a range from about 0.01 microns to about 2.0 microns.

The water-based sulfonated polymer compositions may have a solids content in the range from about 20% by weight to about 70% by weight, and preferably from about 35% by weight to about 55% by weight of the total composition.

The dried sulfonated polymer compositions may have single or multiple glass transition (Tg.) temperatures in a range from about −100° C. to about +200° C.

The present invention is also directed to a water based sulfonated polymer composition which may be used, inter alia, for fiberglass sizing and a method for making the same. The water-based sulfonated polyurethane polyvinyl hybrid latex of the present invention comprises the reaction product of at least one sulfonated polyurethane dispersion, at least one aqueous ethylenically unsaturated monomer pre-emulsion comprising at least one ethylenically unsaturated monomer and at least one free radical initiator, such as those disclosed above.

The present invention is also directed to a water-based sulfonated polymer composition comprising particles, the particles comprising a core and a surface wherein the core and surface comprise substantially different polymers, the core comprising at least one polymer selected from the group consisting of sulfonated polyurethane polymers and sulfonated polyurethane-urea polymers and mixtures thereof, the surface comprising predominantly polyvinyl polymers. The composition may be formed from the free radical seed emulsion polymerization of at least one ethylencially unsaturated monomer in the presence of a sulfonated polyurethane or polyurethane-urea dispersion, the polyurethane serving as a seed.

Sulfonated polyurethane dispersions such as those been disclosed in U.S. Pat. No. 5,608,000 (Duan et al.), U.S. Pat. No. 5,610,232 (Duan et al.) are suitable for use in the present invention. Two sulfonated polyurethane dispersions which are embodiments of the above inventions, NP-4062-M or NP-4073, both of which are produced by the H. B. Fuller Company, are particularly suited for use in the present invention although other sulfonated polyurethane dispersions may be used as well including sulfonated polyurethane-urea dispersions.

The aqueous ethylenically unsaturated monomer will preferably be chosen from among acrylate monomers, (meth)acrylate monomers, (meth)acrylic monomers, vinyl monomers, allylic monomers, acrylamide monomers or mixtures thereof. Examples include methyl acrylate, ethyl acrylate, isobutyl acrylate, n-propylacrylate, iso-propyl acrylate, butyl methacrylate, hexanediol diacrylate, ethylene glycol dimethacrylate, trimethylolpropane triacrylate and pentaerythritol triacrylate and mixtures thereof. Preferably, the emulsion comprising the monomer will comprise methyl methacrylate, n-butyl acrylate, hydroxy ethyl methacrylate and mixtures thereof. However, any of the ethylenically unsaturated monomers mentioned above such as ethylenically unsaturated monomers comprising anionic and/or ionic groups, or ethylenically unsaturated monomers containing active hydrogen atoms may be used as well. A suitable surfactant such as Pluronic L64 (manufactured by BASF) or a combination of surfactants may be used in preparing the pre-emulsion In one embodiment the ratio of sulfonated polyurethane solids to polyvinyl solids is from about 9:1 to about 1:9. Preferably, the ratio is from about 4:1 to about 1:4 and most preferably, the ratio is from about 4:1 to about 2:1.

The present invention is also directed to a water-based sulfonated polyurethane polyvinyl hybrid latex comprising polyurethane polyvinyl particles wherein the average particle size is at least 200 nm.

The water-based sulfonated polymer compositions formed via the seed emulsion polymerization are characterized by high lap shear strengths of at least about 350 psi.

The present invention is also directed to a method for preparing the above-mentioned polyurethane polyvinyl latex hybrid. The method comprises the steps of forming an aqueous pre-emulsion comprising at least one ethylenically unsaturated monomer, the pre-emulsion comprising at least one acrylate and optionally a surfactant and reacting the aqueous pre-emulsion with at least one sulfonated polyurethane dispersion in the presence of at least one free radically initiator.

The aqueous polyvinyl pre-emulsion may be formed by dispersing ethylenically unsaturated monomers in water, with a surfactant and agitating the mixture.

The polyurethane polyvinyl latex dispersion is then formed by adding an initiator solution such as t-butyl hydrogen peroxide, a reducer solution such as hydrosulfite and the pre-emulsion to a polyurethane dispersion. Alternatively, the initiator may already be present in the pre-emulsion or in the polyurethane dispersion. The mixture is allowed to react over a period of time at a temperature between 50° C. and 100° C., preferably at 65° C.

The characteristics of the water-based sulfonated polymer compositions may be modified by the addition of compounds including surfactants, defoaming agents, coalescing aids, fungicides, bactericides, polyfunctional crosslinking agents, plasticizers, thickening agents, fillers, pigments, reactive pigments, dispersing agents for the pigments, colors, perfume-like materials, UV stabilizers, sequestering agents, waxes, oils, fire retardant agents and organic solvents. Such materials may be introduced at any stage of the production process.

The present invention is further illustrated by the following examples.

EXAMPLES

In the examples, the following test methods were used.

Tensile Strength and Elongation

The polymer dispersions were cast to generated dried films having a thickness in a range from about 20 mils. to about 40 mils. Type V dogbones were cut with a Dewes Gumbs Die and conditioned at least 24 hours in an environment having 50% relative humidity at 23° C. The samples were run using ASTMD-638 at a crosshead speed of 5.0 cm./min.

Shear Strength

The polymer dispersions were coated on steel, acrylonitrile-butadienestyrene (ABS) and glass then dried 24 hours. Like substrates were mated using hand pressure then heat activated at 70° C. for 30 minutes. The samples, which has a bond area of 0.5×1.0 inches, were run using ASTM-D-1002 at a crosshead speed of 1.27 cm/min.

Peel Strength

Peel strength was measured as follows. A precut sheet (10.5×12.75 inch) of 10 mil thick clear, pressed, polished PVC was cleaned with isopropyl alcohol and placed on a glass or aluminum plate containing a small amount of isopropyl alcohol. Excess isopropyl alcohol was removed to produce a good seal. The exposed PVC surface was wiped with isopropyl alcohol. An adhesive film, dispensed from a film applicator set to 5 mils, was cast over the PVC sheet, according to the method of ASTM specification D323-87. The adhesive was allowed to dry at ambient temperature. A second sheet of PVC, cleaned similarly to the first sheet, was placed over the first coated PVC sheet. The PVC adhesive sandwich was cut into 1 inch strips and allowed to dry over 2 hours.

The strips were placed into a heat sealer with the uncoated PVC in contact with the upper platen, the upper platen having been preheated to 190° F. and with a pressure setting of 50 psi. Following a 30 second dwell time, the temperature at the bond line was 160° F. A minimum of 6 bonds per strip were heat sealed with a total bond area of 1 inch by 7 inches with 1.5 inches of no bond on both ends.

The bonds were allowed to age at ambient temperature for 1 to 2 hours and 1 week prior to testing. Testing was performed on a Thwing Albert Intellect 500 with a cross head speed of 12 inches per minute, a 1 inch prepeel and 3 inches of recorded peel.

Lap Shear Strength

The sample was coated on glass and allowed to dry overnight. The bond area was 0.5×1.0 in². The lap shear sample was maintained at 160° F. for 30 minutes. Lap shear strength was then measured using ASTM D-1002 with a crosshead speed of 0.5 in/minute. The measurement was made under an environment of 50% relative humidity at a temperature of 23° C.

Example 1

This example describes the preparation of a water-based sulfonated polyurethane-vinyl polymer composition. The composition and its properties are compared to its corresponding polymer components.

Compound 1A

Compound 1A is an aqueous polyvinyl dispersion prepared with a reactive emulsifying agent which is polyvinyl alcohol/polyvinylamine copolymer (PVOH-PVAM) from Air Products & Chemicals, Inc. (Allentown, Pa.).

| | | Grams |
|---|---|---|
| (1) | Reactor charge | |
| | PVOH/PVAM (6% vinyl amine, medium M.W.) | 1.50 |
| | De-ionized water Acetic acid | 350.00 |
| | Acetic acid | 0.30 |
| (2) | Pre-emulsion | |
| | Methyl Methacrylate | 155.00 |
| | N-butyl acrylate | 145.00 |
| | Methacrylic acid | 3.90 |
| | Thiolacetic acid | 0.10 |
| (3) | Delayed Surfactant feed | |
| | T-Det O-407 from Harcros | 7.50 |
| | De-ionized water | 30.00 |
| (4) | Initiator feed | |
| | T-butyl hydroperoxide | 1.28 |
| | De-ionized water | 20.00 |
| (5) | Reducer feed | |
| | Sodium formaldehyde sulfoxide | 0.92 |
| | De-ionized water | 20.00 |

To a reactor equipped with an agitator, thermometer, condenser and nitrogen purge was added reactor charge (1). The mixture was heated to 65° C. and agitated for 30 minutes. While maintaining the reaction temperature at 65° C., the pre-emulsion (2) and surfactant feed (3) was added over a 3 hour period. The initiator feed (4) and reducer feed (5) were added over a 3.5 hour period. Once all the materials were added, the dispersion was heated an additional 30 minutes. The polymer had a solids content of 33.2% and a pH of 2.65.

Compound 1B

Compound 1B is a water-based sulfonated polyurethane-urea polymer.

A reactor was charged with 4.5 grams (0.099 hydroxyl equivalence) 2-methyl-1,3-propanediol and 95.4 grams (0.093 hydroxyl equivalents) molten Rucoflex®. XS-5570-55 which is a sulfonated polyol from Ruco Polymer Corporation based on 5-sulfoisophthalic acid monosodium salt (4% by weight), adipic acid and diethylene glycol. The mixture was charged with 39.96 grams isophorone diisocyanate, eye drop of dibutyl tin dilaurate and heated to 80° C. for 2 hours to produce an isocyanate-terminated polyurethane prepolymer.

The resulting isocyanate-terminated polyurethane prepolymer was dispersed in 247.0 grams de-ionized water at 70° C., using mild agitation, and heated an additional 2 hours at 65° C.

Compound 1C

Compound 1C is a water-based sulfonated polyurethane-vinyl polymer.

139.86 grams of a isocyanate-terminated polyurethane prepolymer, (prepared in the manner of compound 1B), which had a temperature of 80° C., was dispersed in 139.86 grams de-ionized water and agitated for 5 minutes. The dispersed prepolymer was charged with 341.5 grams of an amine and hydroxyl functional polyvinyl dispersion (Compound 1A). The mixture was agitated and heated to 65° C. for 2 hours. The water-based sulfonated polyurethane-vinyl polymer had a solids content of 40.2% and a pH of 6.4.

The compounds were tested for tensile strength, elongation and shear strength on glass, steel and acrylonitrile-butadiene-styrene copolymers (ABS). The results are provided in Table I below:

TABLE 1

Tensile Strength, elongation and shear strength

| Compound | Tensile Strength (Kgs./cu.cm) | Elongation (%) | Shear Strength (Kgs./cu.cm.) Steel/Steel | Glass/Glass | ABS/ABS |
|---|---|---|---|---|---|
| Compound 1A | 117.40 | 1,020 | 20.38 | 18.98 | 40.07 |
| Compound 1B | 60.45 | 3,810 | 18.98 | 21.79 | 26.71 |
| Compound 1C | 75.92 | 1,680 | 33.04 | 40.07 | 39.36 |
| Compound 1A and 1B (50/50 Blend) | 44.29 | 1,130 | 21.79 | 26.71 | 37.26 |

The data shows the sulfonated polyurethane-vinyl polymer (Compound 1C) has enhanced mechanical properties compared to the blend of Compound 1A and 1B. The data also shows Compound 1C has enhanced adhesion properties compared to Compound 1A, Compound 1B and their 50/50 blend, thus showing the utility of the invention.

Example 2

This example describes the preparation of a water-based sulfonated polyurethane-vinyl polymer using vinyl acetate. The inventive polymer properties are compared to its corresponding polymer components.

Compound 2A

Compound 2A is an aqueous polyvinyl acetate dispersion using a reactive emulsifying agent, which is polyvinyl alcohol-polyvinylamine copolymer (PVOH-PVAM), from Air Products & Chemicals, Inc. (Allentown, Pa.).

The polymer was prepared as described in Example 1 (Compound 1A) with the exception that the pre-emulsion contained 265.0 grams vinyl acetate, 35.0 grams n-butyl acrylate, 3.9 grams methacrylic acid and 0.10 grams thiolacetic acid. The resulting polymer dispersion had a solid content of 33.6% and a pH of 2.5.

Compound 2B

Compound 2B is a sulfonated polyurethane prepolymer.

The polymer was prepared exactly as described in Example 1 (Compound 1B).

Compound 2C

Compound 2C is a water-based sulfonated polyurethane-vinyl acetate polymer.

139.86 grams of an isocyanate-terminated polyurethane prepolymer prepared in the manner of compound 1B but before dispersion, which had a temperature of 80° C., was dispersed in 247 grams de-ionized water (70° C.) and agitated for approximately 10 minutes. The dispersed prepolymer was charged with 341.5 grams of the amine and hydroxyl functional polyvinyl dispersion described as Compound 2A. The mixture was mildly agitated and heated to 65° C. for 2 hours. The resulting water-based sulfonated polyurethane-vinyl acetate polymer composition had a solids content of 35.5% and a pH of 6.5.

The compounds were tested for tensile strength, elongation and shear strength on glass, steel and acrylonitrile-butadiene-styrene copolymers (ABS). The results are provided in Table 2:

TABLE 2

Tensile Strength, elongation and shear strength

| Compound | Tensile Strength (Kgs./cu.cm) | Elongation (%) | Shear Strength (Kgs./cu.cm.) Steel/Steel | Glass/Glass | ABS/ABS |
|---|---|---|---|---|---|
| Compound 2A | 131.46 | 330 | 9.14 | 3.51 | 16.17 |
| Compound 2B | 60.45 | 3810 | 21.79 | 21.79 | 26.71 |
| Compound 2C | 120.91 | 1,190 | 26.71 | 32.33 | 34.45 |
| Compound 2A and 2B (50/50 Blend) | 71.00 | 920 | 18.28 | 33.74 | 47.10 |

The data shows the sulfonated polyurethane-vinyl acetate polymer (Compound 2C) has enhanced mechanical properties compared to the blend of Compounds 2A and 2B. The data also shows Compound 2C has enhanced adhesion properties compared to Compound 2A and Compound 2B thus showing the utility of the invention.

Example 3

This example describes the preparation of a water-based sulfonated polyurethane-vinyl polymer wherein the amine functional polyvinyl dispersion is formed using Vinamer EF monomer which is N-ethenylformamide from Air Products & Chemicals, Inc. (Allentown, Pa.).

Compound 3A

Compound 3A is an amine functional polyvinyl dispersion using N-ethenylformamide.

|   |   |   | Grams |
|---|---|---|---|
| (1) | Reactor Charge | | |
| | De-ionized water | | 295.0 |
| | Potassium persulfate | | 0.42 |
| | Deionized water | | 20.0 |
| (2) | Pre-emulsion | | |
| | De-ionized water | | 80.0 |
| | T-Det 0-407 (Hacros) | | 8.86 |
| | Foamaster 111 | | 0.325 |
| | Potassium persulfate | | 0.55 |
| | Methyl methacrylate | | 155.0 |
| | N-butyl acrylate | | 155.0 |
| | Methacrylic acid | | 0.5 |
| (3) | Initiator feed | | |
| | Deionized water | | 20.0 |
| | Potassium persulfate | | 0.42 |
| (4) | Monomer feed | | |
| | Vinamer EF | | 3.1 |

The pre-emulsion (2) was prepared using the following procedure. The water, surfactant, defoamer and initiator were combined and agitated for 15 minutes. The monomers were added to this mixture over a 30 minute period, using agitation, to form a milky white pre-emulsion.

To a reactor equipped with an agitator, thermometer, condenser and nitrogen purge was added the reactor charge (1). The materials were heated to approximately 80° C. and charged with 2% of the total pre-emulsion (2) then stirred an additional 15 minutes. While maintaining a reaction temperature of 80° C., the pre-emulsion (2) was added over a 3 hour period. The monomer feed (4) was added approximately 1.5 hours after the pre-emulsions initial feed. Once all the materials were added, the reaction mixture was heated an additional 30 minutes. To the dispersion was charged 3.1 grams Igepal CO-710, which Is a surfactant from Rhone- Poulenc, and the reaction mixture was heated an additional hour to allow the complete free radical polymerization of said monomers. The incorporated Vinamer EF monomer was then hydrolyzed to a primary amine. This was accomplished by adding 17.5 grams of a 5% sodium hydroxide solution and heating an additional 2 hours at 80° C.

Compound 3B

Compound 3B is a water-based sulfonated polyurethane-vinyl polymer.

To a reaction flask was charged 95.4 grams (0.093 hydroxyl equivalents) Rucoflex® XS-5570-55 and 4.5 grams 2-methyl-1,3-propanediol. The materials were heated to 50° C. and then charged with 39.96 grams isophorone diisocyanate and 1 drop of dibutyl tin dilaurate. The mixture was heated an additional 2 hours at 80° C. The resulting isocyanate-terminated polyurethane prepolymer was dispersed in a solution containing 315 grams of an amine functional polyvinyl polymer (Compound 3A) and 244 grams de-ionized water. The dispersion was stirred for 2 hours at 60° C.

The compounds mechanical and adhesion properties are provided in Table 3:

TABLE 3

Tensile Strength, elongation and shear strength

| Compound | Tensile Strength (Kgs./cu.cm) | Elongation (%) | Shear Strength (Kgs./cu.cm.) | | |
| --- | --- | --- | --- | --- | --- |
| | | | Steel/ Steel | Glass/ Glass | ABS/ ABS |
| Compound 3A | 55.46 | 1,987 | 10.89 | 14.34 | 23.90 |
| Compound 3B | 48.36 | 2,118 | 19.47 | 17.78 | 27.27 |

Example 4

Example 4 describes the preparation of water-based polymer compositions wherein isocyanate-terminated sulfonated polyurethane prepolymers are dispersed in hydroxy functional water-based polyacrylic dispersions.

Compound 4A

Compound 4A is a hydroxyl functional polyacrylic dispersion wherein the hydroxyl groups are within the latex particle.

| | | Grams |
| --- | --- | --- |
| (1) | Reactor Charge | |
| | De-ionized water | 275.0 |
| | Methacrylic acid | 1.0 |
| (2) | Pre-emulsion | |
| | De-ionized water | 80.0 |
| | T-Det 0-407 (Hacros) | 8.86 |
| | Methyl methacrylate | 155.0 |
| | N-butyl acrylate | 155.0 |
| | Hydroxyl ethyl acrylate | 10.85 |
| | N-dodecyl mercaptan | 0.31 |
| (3) | Initiator fee | |
| | De-ionized water | 20.0 |
| | T-butyl hydroperoxide | 1.37 |
| (4) | Reducer feed | |
| | De-ionized water | 20.0 |
| | Sodium formaldehyde sulfoxide | 0.97 |

To a reactor equipped with an agitator, thermometer, condenser and nitrogen purge was added the reactor charge (1). The water was heated to approximately 65° C. and then charged with 3% of the total pre-emulsion. While maintaining a reaction temperature of 65° C., the pre-emulsion (2), was added over a 3 hour period while the initiator feed (3) and reducer feed (4) were added over a 4 hour period. The reaction mixture was charged with 10.85 grams hydroxyl ethyl acrylate after addition of approximately 75% of the pre-emulsion. Once all the materials were added, the reaction mixture was heated an additional hour. The dispersion had a solids content of 45.2%, a pH of 2.65 and a number average particle size diameter of 443 nanometers.

Compound 4B

Compound 4B is a hydroxyl functional polyacrylic dispersion wherein a portion of the hydroxyl groups are distributed on the surface of the particle.

| | | Grams |
| --- | --- | --- |
| (1) | Reactor Charge | |
| | De-ionized water | 275.0 |
| | Methacrylic acid | 1.0 |
| (2) | Pre-emulsion | |
| | De-ionized water | 80.0 |
| | T-Det 0-407 (Hacros) | 8.86 |
| | Methyl methacrylate | 155.0 |
| | N-butyl acrylate | 155.0 |
| | N-dodecyl mercaptan | 0.31 |
| (3) | Initiator fee | |
| | De-ionized water | 20.0 |
| | T-butyl hydroperoxide | 1.37 |
| (4) | Reducer feed | |
| | De-ionized water | 20.0 |
| | Sodium formaldehyde sulfoxide | 0.97 |

To a reactor equipped with an agitator, thermometer, condenser, and nitrogen purge was added the reactor charge (1). The water was heated to approximately 65° C. and then charged with 3% of the total pre-emulsion (2). While maintaining a reaction temperature of 65° C., the pre-emulsion (2) was added over a 3 hour period while the initiator feed (3) and reducer feed (4) were added over a 4 hour period. The reaction mixture was charged with 10.85 grams of hydroxyl ethyl acrylate after addition of approximately 75% of the pre-emulsion. Once all the materials were added, the reaction mixture was heated an additional hour. The dispersion had a solids content of 45.2%, a pH of 2.65 and a number average particle size diameter of 443 nanometers.

Compound 4C

Compound 4C is a sulfonated polyurethane prepolymer.

A reactor was charged with 4.5 grams (0.099 hydroxyl equivalents) 2-methyl-1,3-propanediol and 95.4 grams (0.093 hydroxyl equivalence) molten Rucoflex® XS-5570-55 which is a sulfonated polyol from RUCO Polymer Corporation based on 5-sulfoisophthalic acid monosodium salt (4% by weight), adipic acid and diethylene glycol. The mixture was charged with 39.96 grams isophorone diisocyanate, 1 drop of dibutyl tin dilaurate and heated to 80° C. for 2 hours.

Compound 4D

Compound 4D is a water-based sulfonated polyurethane-urea polymer.

139.86 grams of the prepolymer (80° C.) described as Compound 4C was charged with 629.3 grams de-ionized water (65° C.) and stirred for 2 hours keeping the temperature below 65° C.

Compound 4E

Compound 4E is of a water-based sulfonated polyurethane-acrylic polymer composition.

139.86 grams of the prepolymer (80° C.) described as Compound 4C was dispersed in 309.4 grams of a hydroxyl functional polyacrylic dispersion (65° C.) described as Compound 4A. The dispersion mixture was stirred for 5 minutes and then charged with 250.0 grams of de-ionized water (65° C.). The materials were heated an additional 2 hours at 65° C. to generate a polymer composition having a solids content of 40.2% and a pH of 6.5.

Compound 4F

Compound 4F was prepared as similarly described as Compound 4E with the exception that 312.2 grams of the hydroxyl functional polyacrylic dispersion described as Compound 4B was used. The polymer composition had a solids content of 40% and a pH of 6.5.

The compounds mechanical properties are diagramed below in Table 4:

TABLE 4

Tensile Strength and elongation

| Compound | Tensile Strength (Kgs./cu.cm.) | Elongation (5) |
|---|---|---|
| Compound 4A | 71.8 | 1,484 |
| Compound 4B | 94.3 | 1,648 |
| Compound 4C | 60.7 | 3,807 |
| Compound 4D | 120.8 | 2,205 |
| Compound 4E | 117.0 | 2,437 |
| Compound 4A and 4C (50/50 Blend) | 61.0 | 2,620 |
| Compound 4B and 4C (50/50 Blend) | 68.3 | 2,537 |

The data shows the inventive polymer compositions (Compounds 4E and 4F) have enhanced tensile strength compared to Compound 4A, Compound 4B, Compound 4D, the 50/50 blend of Compound 4A and 4D and the 50/50 blend of Compound 4B and 4D.

Example 5

This example describes the preparation of a water-based sulfonated polyurethane-urea/polyvinyl polymer and its properties compared to its corresponding polymer components.

Compound 5A

Compound 5A describes the preparation of a polyvinyl dispersion which is free of active hydrogen atoms.

| | | Grams |
|---|---|---|
| (1) | Reactor Charge | |
| | De-ionized water | 290.0 |
| (2) | Pre-emulsion | |
| | De-ionized water | 90.0 |
| | T-Det 0-407 (Hacros) | 15.0 |
| | Methyl methacrylate | 170.0 |
| | N-butyl acrylate | 180.0 |
| | Methacrylic acid | 7.0 |
| | N-dodecyl mercaptan | 7.0 |
| (3) | Initiator fee | |
| | Deionized water | 30.0 |
| | T-butyl hydroperoxide | 2.15 |
| (4) | Reducer feed | |
| | De-ionized water | 30.0 |
| | Sodium formaldehyde sulfoxide | 2.10 |

To a reactor equipped with an agitator, thermometer, condenser and nitrogen purge was added (1) the reactor charge. The water was heated to approximately 65° C. and then charged with 3% by weight of the total pre-emulsion (2). While maintaining a reaction temperature of 65° C., the pre-emulsion (2), initiator feed (3), reducer feed (4) were added over a 3 hour period. Once all the materials were added, the dispersion was heated an additional hour.

Compound 5B

Compound 5B is a water-based sulfonated polyurethane-urea polymer.

To a reaction vessel was charged 95.4 grams (0.093 hydroxyl equivalents) Rucoflex® XS-5570-55 and 4.5 grams 2-methyl-1,3-propanediol. The mixture was heated to 50° C. then charged with 39.96 grams isophorone diisocyanate and 1 drop of dibutyl tin dilaurate. The mixture was heated to 80° C. for approximately 2 hours using mild agitation. The isocyanate-terminated polyurethane prepolymer was then dispersed in 339.4 grams de-ionized water and charged with a solution containing 2.88 grams ethylene diamine, 1.09 grams diethylene triamine and 20 grams de-ionized water.

Compound 5C

Compound 5C is a water-based sulfonated polyurethane-urea/polyvinyl dispersion.

To a reaction vessel was charged 95.4 grams (0.093 hydroxyl equivalents) Rucoflex® XS-5570-55 and 4.5 grams 2-methyl-1,3-propanediol. The mixture was heated to 50° C. then charged with 39.96 grams isophorone diisocyanate and 1 drop of dibutyl tin dilaurate. The mixture was heated to 80° C. for approximately 2 hours using mild agitation to give an isocyanate-terminated polyurethane prepolymer. The isocyanate terminated polyurethane prepolymer was then dispersed in a mixture containing 339.4 grams de-ionized water and 969.3 grams of the polyacrylic dispersion, compound 5A, which mixture had been adjusted to a pH of 9.3, using 10% sodium hydroxide/water mixture, before the dispersion process. The resulting isocyanate-terminated polyurethane prepolymer/polyvinyl dispersion was charged with a solution containing 2.88 grams ethylene diamine, 1.09 grams diethylene triamine and 20 grams de-ionized water. The resulting water-based sulfonated polyurethane-urea/polyvinyl polymer had a solids content of 35% and a pH of 9.0.

The compounds described above were tested for shear strength on glass, steel and acrylonitrile-butadiene-styrene copolymers (ABS). The results are provided in Table 5 below:

TABLE 5

| | Shear strength | | |
|---|---|---|---|
| Shear Strength | Shear Strength (Kgs./cu.cm.) | | |
| (Kgs./cu.cm.) | Glass/Glass | Steel/Steel | ABS/ABS |
| Compound 5A | 41.6 | 55.95 | 19.19 |
| Compound 5B | 20.87 | 11.17 | 25.94 |
| Compound 5C | 75.71 | 59.82 | 31.21 |
| Compound 5A and 5B (50/50 Blend) | 23.48 | 23.97 | 23.12 |

The data shows the inventive polymer (Compound 5C) has increased shear strength compared to Compound 5A, Compound 5B and the 50/50 blend of Compound 5A and 5B showing the utility of the invention.

Examples 6 and 7 relate to the formation of water based sulfonated polymer compositions in which a polyurethane dispersion is used as a seed to polymerize (meth)acrylic monomers. The resulting water based sulfonated polymer composition may be used for fiberglass sizing. As used herein, acrylic denotes acrylate, methacrylic acid, and acrylamide.

Example 6

Synthesis of polyurethane dispersion acrylic hybrid latex

Example 6 describes the preparation of a water based sulfonated polymer composition by seed emulsion polymerization and its properties compared to the blend of its corresponding polymer components.

Compound 6A

Compound 6A is a polyacrylate pre-emulsion.

|     |                                      | Grams |
| --- | ------------------------------------ | ----- |
| (1) | Reactor charge                       |       |
|     | Deionized water                      | 90.8  |
|     | Pluronic L64 (a surfactant, BASF)    | 9.08  |
| (2) | Monomer Mixture                      |       |
|     | Methyl methacrylate (ICI)            | 159.6 |
|     | N-butyl acrylate (Hoechst Celanese)  | 163.5 |
|     | Hydroxyl ethyl methacrylate (Rohm & Haas) | 6.49 |

Reactor charge (1) was added to a kettle with an agitator and mixed for 10 minutes at a temperature of 25° C. Monomer mixture (2) was then added over a period of 30 minutes under agitation to the kettle. The mixture was mixed for an additional 10 minutes at a temperature of 25° C. The resulting pre-emulsion was transferred to a feed tank.

Compound 6B

Compound 6B is a polyurethane dispersion for use in the preparation of the inventive compositions.

|     |                                | Grams |
| --- | ------------------------------ | ----- |
| (1) | Reactor charge                 |       |
|     | Deionized water,               | 181.7 |
|     | Thiolactic acid (Evans)        | 0.065 |
|     | Hydrosulfite AWC (Henkel)      | 0.065 |
|     | Hamp-O 14.5% Iron (Hampshire)  | 0.039 |

Reactor charge (1) was added to a jacketed clean reaction kettle equipped with agitator, thermometer, condenser and nitrogen purge and mixed well. 332.3 Grams of NP4062-M (a polyurethane dispersion, H. B. Fuller Company) was added to the mixture. The reactor, under nitrogen purge, was agitated and the temperature raised to 65° C.

Compound 6C

Compound 6C is a water based sulfonated polymer composition prepared by seed emulsion polymerization.

Over a period of 4.5 hours, the polyacrylate pre-emulsion (Compound 6A), an initiator solution containing 1.95 grams of t-butyl hydrogen peroxide (Akzo) and 19.5 grams of deionized water, a reducer solution containing 0.91 grams of hydrosulfite AWC (Henkel) and 19.5 grams of deionized water, were fed to a jacketed clean reaction kettle equipped with agitator, thermometer, condenser and nitrogen purge containing the polyurethane dispersion mixture (Compound 6B). Following completion of the feeds, the mixture was held at constant temperature for another hour to allow the full conversion of monomers. The reactor was then cooled to ambient temperature and the resulting latex filtered through 200 mesh filter. A stable latex with 45% solids, pH 7.35 and viscosity of 316 cps was obtained.

Additional compounds were prepared similarly to compound 6C varying the amount of compound 6B resulting in a water based sulfonated polymer composition with different polyurethane /polyacrylate (PU/PA) ratios. Compound 6C, and similarly prepared compounds with different polyurethane/polyacrylic ratios, and blends of compounds 6A and 6B, (absent the initiator and reducer solutions) were tested for tensile strength and elongation, peel strength (using a clear and a white PVC sheet as substrates) and lap shear strength. The results are provided in Tables 6–9. Note that the polyurethane to polyacrylate ratio is based on solids content of the polyurethane and the polyacrylate. Thus a PU/PA ratio of 75/25 indicates that there are 3 parts polyurethane solids for every part of polyacrylate solids. Also note that the "hybrid" referred to in Table 9 is prepared as in Compound 6C with a PU/PA ratio of 25/75. The blend in Table 9 has a PU/PA ratio of 25/75.

TABLE 6

Tensile Strength and elongation:

| PU/PA Ratio | Tensile Strength (PSI) Blend | Hybrid | Tensile Elongation (%) Blend | Hybrid |
| --- | --- | --- | --- | --- |
| 100/0 | 6505 | — | 3383 | — |
| 75/25 | 3285 | 3386 | 3383 | 3636 |
| 50/50 | 1793 | 1860 | 3011 | 3166 |
| 25/75 | 1190 | 1317 | 2356 | 2386 |
| 0/100 | 908 | — | 1780 | — |

TABLE 7

Peel Strength, Clear PVC Film

| PU/PA Ratio | Green strength (PSI) Blend | Hybrid | 7 Day Strength (PSI) Blend | Hybrid |
| --- | --- | --- | --- | --- |
| 100/0 | 5.6 | — | 3.2 | — |
| 75/25 | 5.4 | 6.1 | 5.1 | 6.8 |
| 50/50 | 4.3 | 5.9 | 1.7 | 6.8 |
| 25/75 | 2.0 | 6.3 | 0.6 | 5.4 |
| 0/100 | 2.5 | — | 0.8 | — |

TABLE 8

Peel Strength, White PVC Film: (Hybrid prepared with Example 6)

Peel Strength, Clear PVC Film

| PU/PA Ratio | Green strength (PSI) Blend | Hybrid | 7 Day Strength (PSI) Blend | Hybrid |
| --- | --- | --- | --- | --- |
| 100/0 | 2.6 | — | 2.0 | — |
| 75/25 | 4.6 | 4.4 | 4.2 | 3.7 |
| 50/50 | 5.4 | 5.3 | 4.6 | 5.1 |
| 25/75 | 4.6 | 5.4 | 1.1 | 4.4 |
| 0/100 | 4.3 | — | 2.2 | — |

TABLE 9

Lap Shear Strength: (glass to glass)

| Material | Lap Shear Strength (PSI) |
| --- | --- |
| NP-4062 | 54 |
| Hybrid | 393 |
| Blend | 210 |
| Acrylic | 60 |

Example 7

Synthesis of Water—Chain-Extended Water Based Sulfonated Polymer Composition With the sample process of Example 6, another water based sulfonated polymer composition was prepared in the manner of Example 6C except that the polyurethane dispersion NP-4062 used to prepare compound 6B was replaced by NP-4073 (a sulfonated polyurethane dispersion, H. B. Fuller Company).

Figure 2:
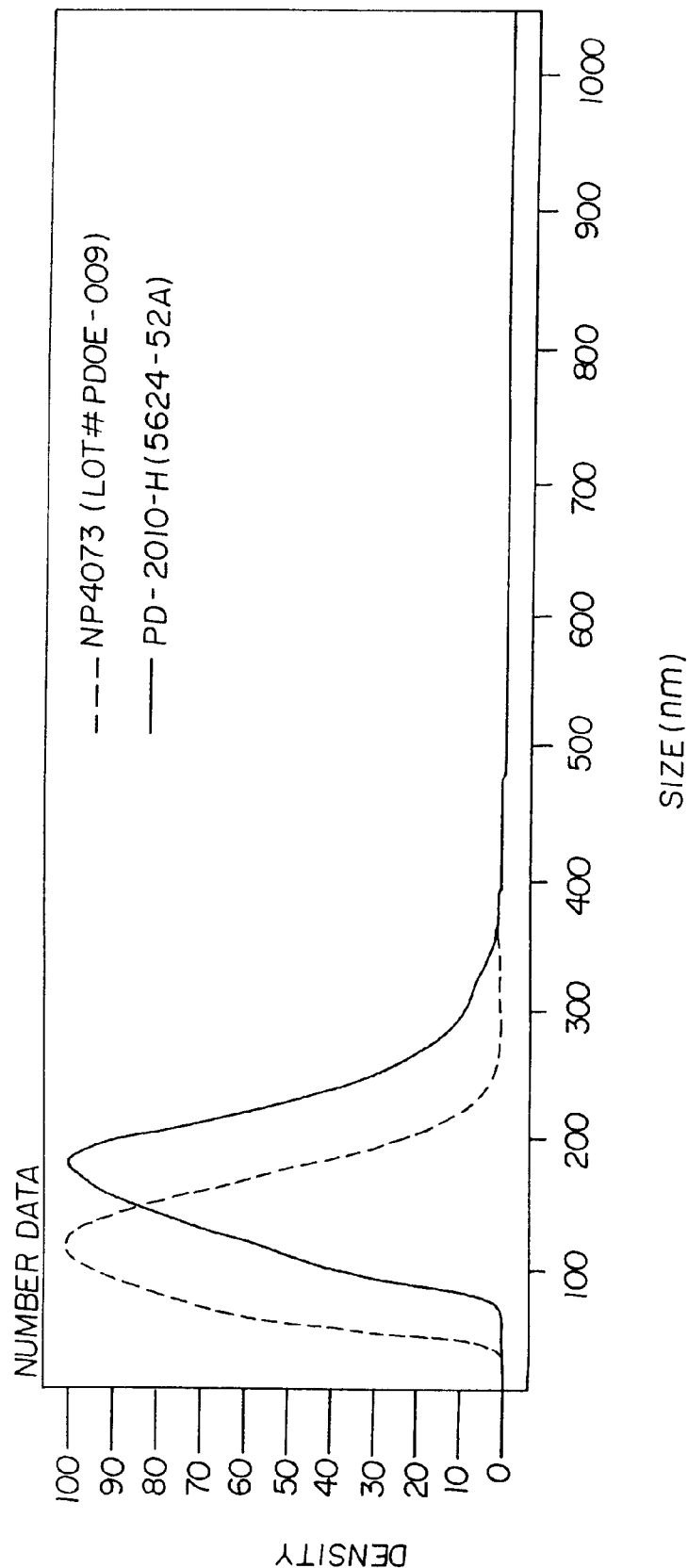
FIG. 2 is a graph showing the seed polyurethane particle size distribution (dotted line) as a function of the final hybrid latex particle distribution (solid line), for the latex (water based sulfonated polymer composition) prepared in Example 7.

Capillary Hydrodynamic Fractionation was used to monitor the latex particle growth in Examples 6 and 7. FIGS. 1 and 2 present the seed polyurethane particle size distribution (dotted line) as a function of the final hybrid latex particle distribution (solid line), for the latex (water based sulfonated polymer composition) prepared in Examples 6 and 7. Both figures demonstrate that no new population of acrylic particles was generated, implying that a polyurethane-core-polyacrylic-shell hybrid structure was formed. The unique hybrid morphology of the water based sulfonated polymer composition latex in this disclosure leads to superior physical properties compared to the corresponding blend or common alloy.

What is claimed is:

1. A method for the preparation of a water-based sulfonated polymer composition by seed emulsion polymerisation comprising the steps of:
    a) providing a water based sulfonated polyurethane urea polymer dispersion;
    b) providing at least one free radical initiator;
    c) forming at least one pre-emulsion, the at least one pre-emulsion comprising one or more ethylenically unsaturated monomers, water and at least one surfactant; and
    d) polymerizing said monomers in the presence of said dispersion, the polymerization initiated by the free radical initiator, the polyurethane serving as a seed.

2. The method of claim 1 wherein the free radical initiator is present in the pre-emulsion.

3. The method of claim 1 wherein the free radical initiator is present in the water based sulfonated polyurethane dispersion.

4. The method of claim 1 wherein the free radical initiator is provided via an independent feed.

5. The method of claim I wherein the monomer is selected from the group consisting of monoethylenically unsaturated monomers, polyethylenically unsaturated monomers and mixtures thereof.

6. The method of claim 1 wherein the monomer is selected from the group consisting of acrylate monomers, (meth)acrylate monomers, vinyl monomers, allylic monomers, acrylamide monomers and mixtures thereof.

7. The method of claim 1 wherein the ethylenically unsaturated monomers contain active hydrogen atoms.

8. The method of claim 1 wherein the initiator is selected from the group consisting of hydrogen peroxide, sodium persulfate, potassium persulfate, ammonium persulfate, 2,2-azobis (2,4-dimethylpentanenitrile), 2,2-azobis (2-methylpropanenitrile), a mixture of t-butylhydroperoxide, Fe.EDTA and isoascorbic acid and mixtures thereof.

9. The method of claim 1 wherein the ratio of sulfonated polyurethane solids to polyvinyl solids formed as a result of the polymerization is from about 9:1 to about 1:9.

10. The method of claim 1 wherein the pre-emulsion and dispersion are maintained at a temperature of between about 50° C. and 100° C. during the polymerization.

11. A water-based sulfonated polymer composition comprising the reaction product of:
    a) at least one sulfonated polyurethane urea polymer dispersion;
    b) at least one pre-emulsion, the pre-emulsion comprising at least one ethylenically unsaturated monomer, water and a surfactant; and
    c) at least one free radical initiator;
wherein said dispersion is used as a seed for the polymerization of the ethylenically unsaturated monomer and said free radical initiator initiates the polymerization of the ethylenically unsaturated monomer.

12. The water-based sulfonated polymer composition of claim 11 wherein the ethylenically unsaturated monomer is selected from the group consisting of monoethylenically unsaturated monomers, polyethylenically unsaturated monomers and mixtures thereof.

13. The water-based sulfonated polymer composition of claim 11 wherein the monomer is selected from the group consisting of acrylate monomers, (meth)acrylate monomers, vinyl monomers, allylic monomers, acrylamide monomers and mixtures thereof.

14. The water-based sulfonated polymer composition of claim 11 wherein the ethylenically unsaturated monomers contain active hydrogen atoms.

15. The water-based sulfonated polymer composition of claim 11 wherein the initiator is selected from the group consisting of hydrogen peroxide, sodium persulfate, potassium persulfate, ammonium persulfate, 2,2-azobis (2,4-dimethylpentanenitrile), 2,2-azobis (2-methylpropanenitrile), a mixture of t-butylhydroperoxide, Fe.EDTA and isoascorbic acid and mixtures thereof.

16. The water-based sulfonated polymer composition of claim 11 wherein the composition exhibits a lap shear strength of at least about 350 psi.

17. The water-based sulfonated polymer composition of claim 11 wherein the composition comprises particles, the particles comprising a core and a surface wherein the core and surface comprise substantially different polymers, the core comprising at least one polymer selected from the group consisting of sulfonated polyurethane polymers and sulfonated polyurethane-urea polymers and mixtures thereof, the surface comprising predominantly polyvinyl polymers.

18. The water-based sulfonated polymer composition of claim 11 wherein the ratio of sulfonated polyurethane solids to polyvinyl solids formed as a result of the polymerization is from about 9:1 to about 1:9.

19. A method for the preparation of the water-based sulfonated polyurethane polyvinyl hybrid latex of claim 11 comprising the steps of forming an aqueous pre-emulsion comprising at least one ethylenically unsaturated monomer pre-emulsion, the pre-emulsion comprising at least one acrylate and optionally a surfactant, and reacting said aqueous pre-emulsion with at least one sulfonated polyurethane dispersion in the presence of an initiator.

20. A fiberglass sizing comprising the water-based sulfonated polymer composition of claim 1.

21. An interpenetrating or crosslinked network formed from:
   a) at least one dispersion of a water based sulfonated polyurethane-urea polymer;
   b) at least one pre-emulsion comprising one or more ethylenically unsaturated monomers, water and at least one surfactant; and
   c) at least one free radical initiator;
   whereby the interpenetrating or crosslinked network is formed through a seed emulsion polymerization process wherein the sulfonated polyurethane-urea polymer acts as the seed.

* * * * *